Jan. 13, 1948.   L. J. WASINGER   2,434,376
COMBINED BUCKRAKE AND STACKER
Filed Dec. 15, 1945   4 Sheets-Sheet 2
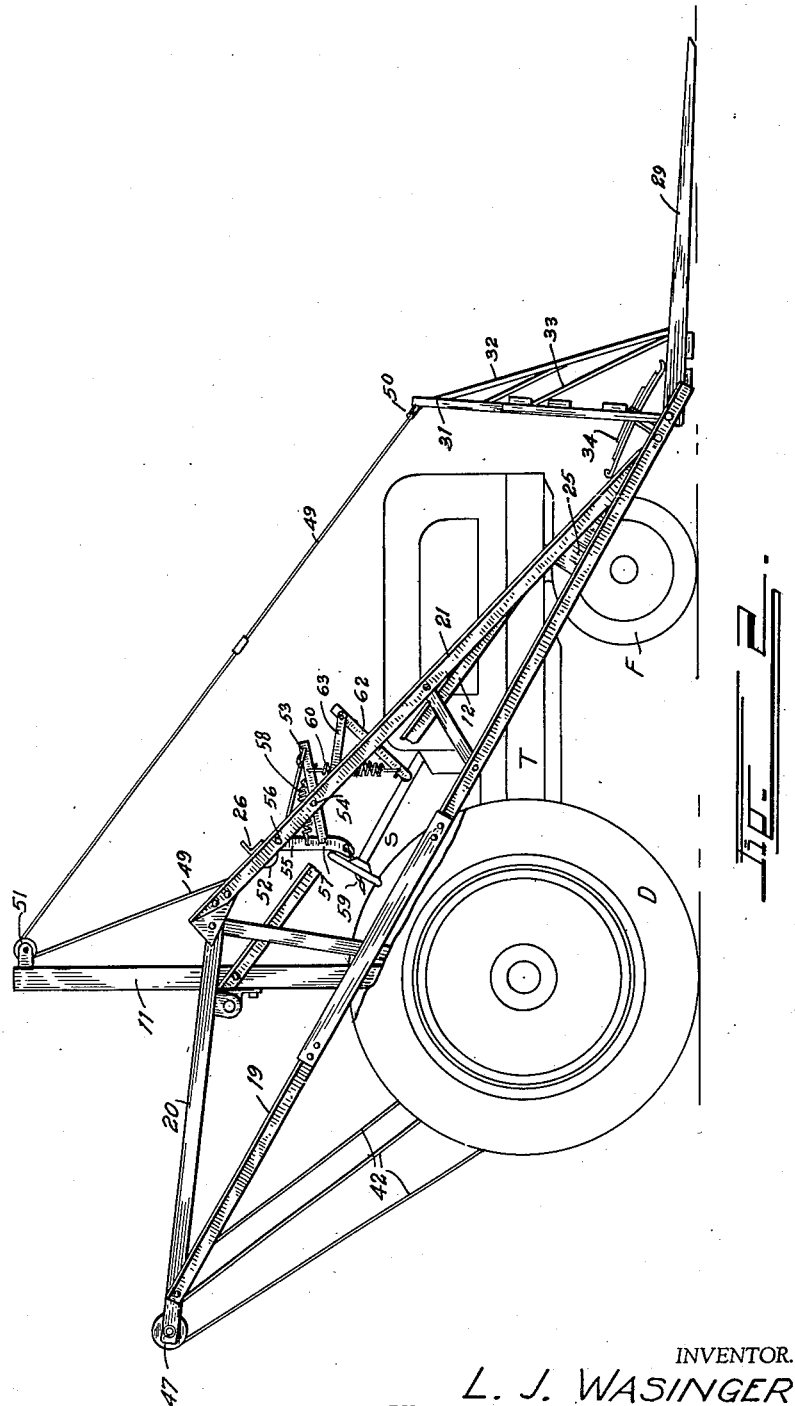
INVENTOR.
L. J. WASINGER.
BY Martin E. Anderson
ATTORNEY.

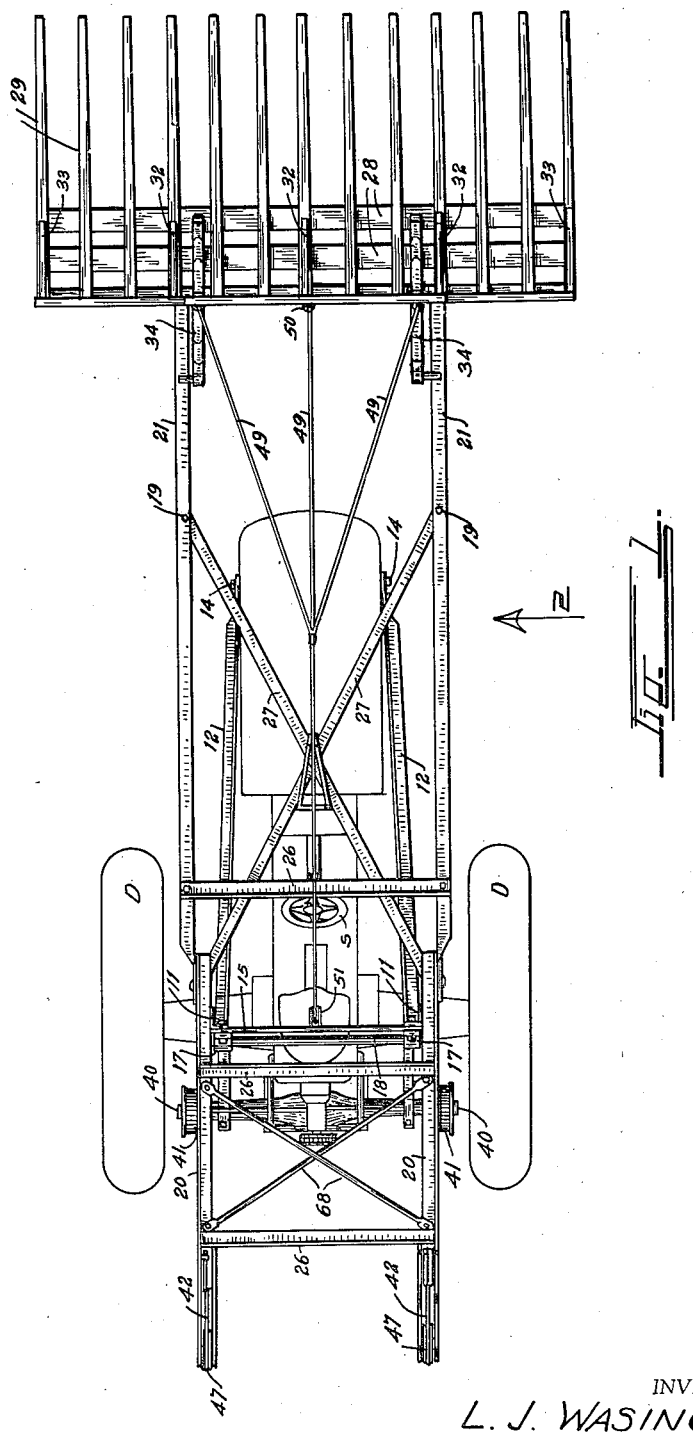

Jan. 13, 1948.    L. J. WASINGER    2,434,376
COMBINED BUCKRAKE AND STACKER
Filed Dec. 15, 1945    4 Sheets—Sheet 3
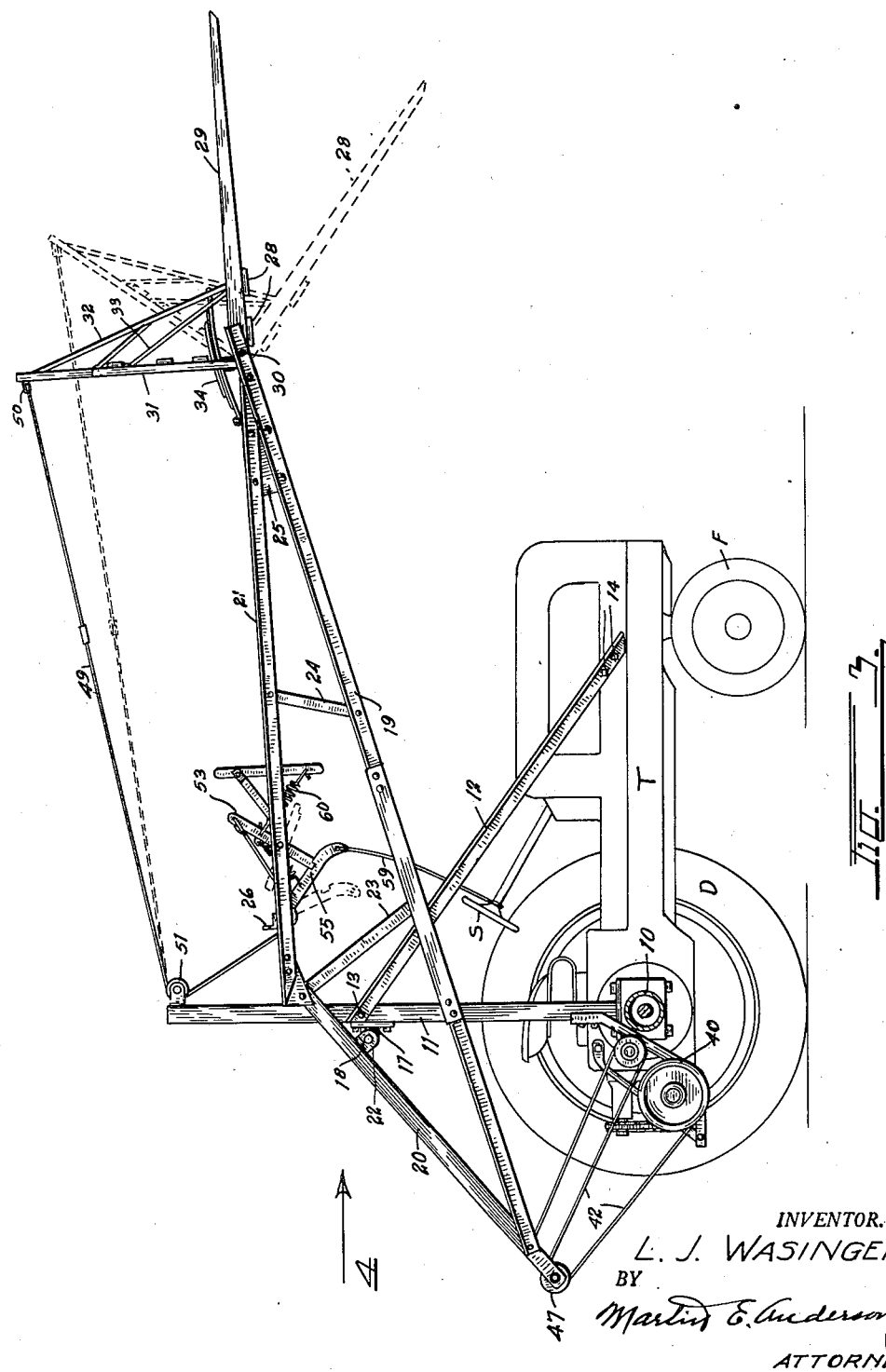
INVENTOR.
L. J. WASINGER.
BY
Martin E. Anderson
ATTORNEY.

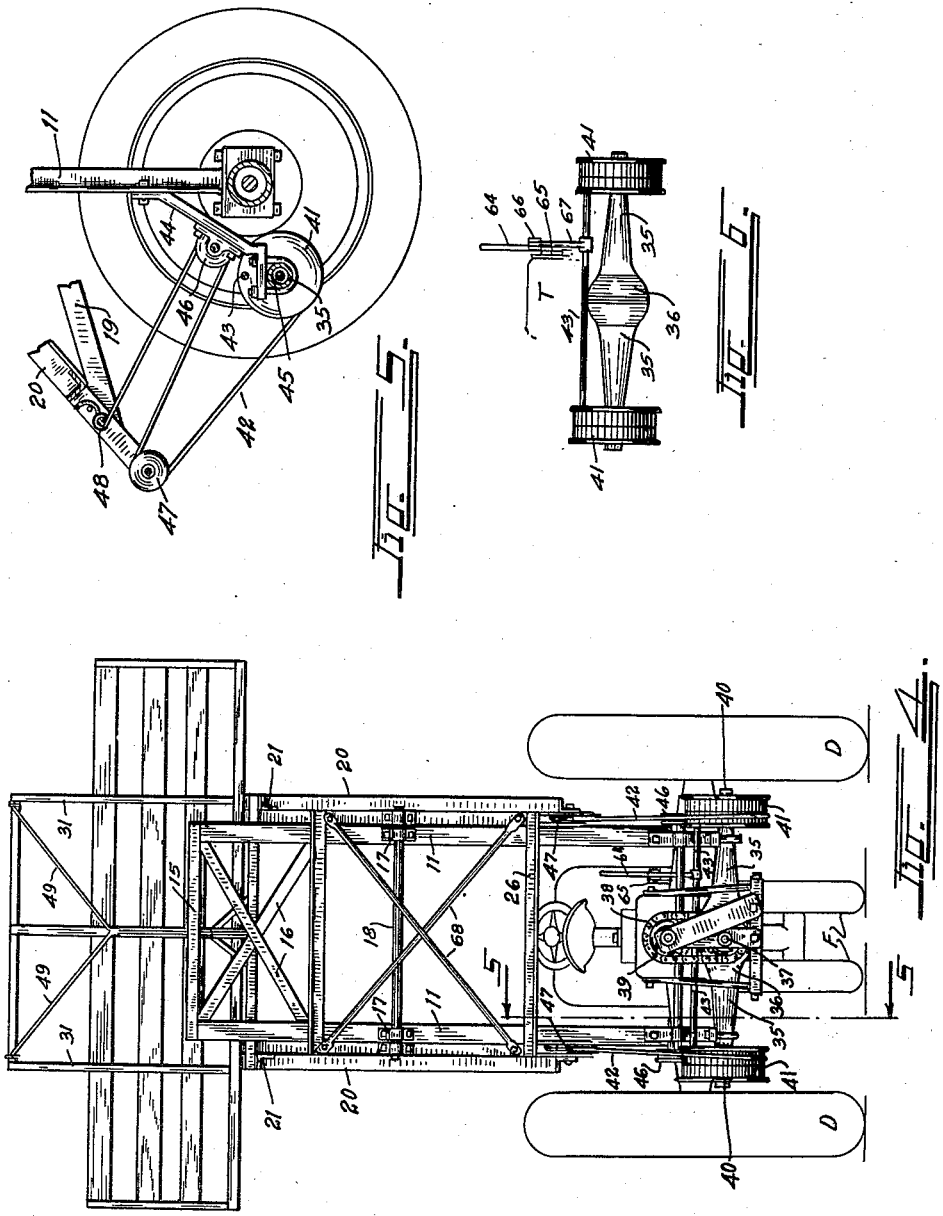

Patented Jan. 13, 1948

2,434,376

UNITED STATES PATENT OFFICE 2,434,376

COMBINED BUCKRAKE AND STACKER

Leonard J. Wasinger, Wakeeney, Kans.

Application December 15, 1945, Serial No. 635,156

1 Claim. (Cl. 214—140)

This invention relates to improvements in combined buck rakes and stackers of the type operated by means of power from a tractor.

In parts of our country where hay in large quantities is raised for fodder, it is customary to cut the hay and rake it into windrows after which it is gathered by means of a buck rake and transferred to the stack. Sometimes the hay is transferred from the buck rake onto a stacker that elevates it and deposits it on the stack and in other cases the buck rake is of such construction that it can elevate the load to the required height and dump it onto the stack.

It is the object of this invention to produce a combined buck rake and stacker of a simple and substantial construction that can be fitted to an ordinary farm tractor and operated by power derived from the tractor.

A further object of the invention is to produce an improved mechanism for holding the rake in operative position during the hay gathering process and for maintaining it in a predetermined horizontal position during the transportation of the hay and its elevation to the required height.

A further object is to produce a latch mechanism that can be readily released by the operator and which is so constructed that it will automatically return the rake head to the operative position and latch it there.

A further object of the invention is to produce a simple winch mechanism that is operated from the power takeoff of the tractor, for the purpose of elevating the rake head during operation and in connection with which a brake mechanism is provided for controlling the downward movement of the rake head.

A further object of the invention is to produce a mechanism of the class described in which means comprising a spring is provided for holding the rake teeth in operative engagement with the surface of the ground.

A further object of the invention is to produce a frame construction of great simplicity and strength which can be constructed of a minimum weight with respect to the strength of the assembly.

The above and other objects that may become apparent as the description proceeds are attained by means of a construction and an arrangement of parts that will now be described in detail, and for this purpose reference will be had to the accompanying drawings in which the invention has been illustrated in its preferred form, and in which:

Figure 1 is a top plan view of the mechanism showing the same in position on a farm tractor;

Figure 2 is a side elevation looking in the direction of arrow 2 in Figure 1 and shows the rake in operative position;

Figure 3 is a side elevation similar to that shown in Figure 2, but shows the parts in partly elevated position, the position of the rake head for dumping the load being indicated by broken lines;

Figure 4 is a rear end view looking in the direction of arrow 2, Figure 3;

Figure 5 is a section taken on line 5—5, Figure 4; and

Figure 6 is a view showing in a more or less diagrammatic manner, the mechanism for operating the brakes that control the winch.

In the drawing the tractor has been shown in outline and designated by reference character T, the drivewheels have been designated by D, the front dirigible wheels by reference character F and the steering wheel by reference character S.

The rear axle housing of the tractor has been designated by reference numeral 10. Secured to the rear axle housing and extending upwardly therefrom are two vertical frame members 11. Diagonal braces 12 are connected to the vertical members at 13 and have their lower ends connected to the tractor at 14, the usual point of attachment being the cultivator mounting with which tractors are usually provided. The upper ends of vertical frame members 11 are connected by a transverse bar 15 and cross braces 16 serve to give rigidity to the frame and prevent lateral movement thereof. Secured to the rear flanges of the vertical frame members are bearings 17 in which is mounted a shaft 18.

A double lifting frame of triangular shape, each comprising compression member 19 and two tension members 20 and 21 is pivotally supported by the ends of shaft 18 and for this purpose the tension members 20 are provided with downwardly extending lugs 22 having openings for the reception of shaft 18 in the manner shown in Figure 3.

It will be observed that lugs 22 are not positioned at the upper vertex of the triangular lifting frame, but a short distance downwardly therefrom. Transverse members 23 and 24 give added rigidity to the frame. The front ends of frame members 19 and 21 are connected by means of a plate 25 that extends rearwardly to some distance, as shown in Figures 2 and 3. A transverse bar 26 is secured to the upper flanges of members 21. Diagonal braces 27, Figure 2, connect the opposite ends of members 21 as shown in Figure 1 and give transverse rigidity to the construction.

A rake head comprising two transversely extending frame members 28 and a number of rake teeth 29 connected therewith is pivoted at 30 to the front ends of compression members 19. A back frame comprising vertical members 31 and diagonal braces 32 and 33 is connected with the rake as shown most clearly in Figures 2 and 3. This frame limits the rearward movement of the hay and also serves as a lever for tilting the rake head about its pivotal connection with the lifting frame. A spring 34 has been shown as connected to the rake head and to the lifting frame and serves to exert a force on the rake head tending to turn it downwardly towards the dotted line position shown in Figure 3 and this serves to urge the teeth against the ground when the parts are in the operative position shown in Figure 2. It is to be understood that any other mechanical equivalent can be substituted for a spring 34, the latter has merely been shown to illustrate a means for this purpose.

Secured to the rear axle housing of the tractor by suitable means is a winch mechanism which, in the present embodiment, comprises a rear automobile axle housing and differential assembly of usual construction. The two parts of the axle housing have been designated by reference numeral 35 and the differential housing by reference numeral 36. A shaft 37 that corresponds to the drive shaft of an automobile, projects rearwardly and carries a sprocket wheel that cooperates with a sprocket chain 38 that, in turn, cooperates with a sprocket wheel 39 which is rotated from the power takeoff of the tractor. When the sprocket chain is operated, it rotates shaft 37 and the axles 40. Instead of the ordinary automobile wheels, a drum 41 is connected with each end of the axles 40. Drums 41 are each formed from two brake drums arranged in opposed relation as shown quite clearly in Figure 4. Lifting cables 42 have each one end connected with a winch drum and the other with the frame in the manner which will presently be described.

Although in the present embodiment the rear axle housing 35 contains a differential gear, it is to be understood that the differential mechanism is not necessary in the present construction and that an ordinary bevel gear drive can be substituted therefor. The automobile rear axle has been selected merely because it was possible to employ such a construction without any material change. The rear axle assembly is provided with brakes of the kind employed in connection with automobiles and these are controlled by means of a shaft 43 that is rotated by means of a link and lever mechanism that will be described in connection with Figure 6.

The rear axle housing 35 that forms part of the winch is connected with the tractor by means of brackets 44 in a manner shown in Figure 5, the housing being secured to the lower ends of the brackets by means of U-bolts 45. Of course any other suitable connection can be substituted if desired. Secured to the supporting brackets 44 are pulleys 46 that are journaled in suitable bearings. Cables 42, to which reference has already been made, have one end connected with a winch drum and pass around pulleys 47 secured to the lower rear ends of frame members 20 and pass from thence forwardly around pulleys 46, thence rearwardly and are anchored to the lifting frame at the point designated by reference numeral 48, all as shown in Figure 5. It is evident now that when the winch drums 41 are rotated in a counterclockwise direction, when viewed as in Figure 5, the cables 42 will be wound onto the drums and move the lower rear end of the lifting frame downwardly, thereby imparting a corresponding upward movement to the front end and to the rake head. By means of the brake that cooperates with the drums 41, the lifting frame can be latched in an elevated position and can be lowered gradually by proper manipulation of the brake.

For the purpose of controlling the angular position of the rake head with respect to a horizontal plane, a cable 49 is connected to the upper end of frame 31 at point 50 and passes from thence over a pulley 51 that is secured to the transverse bar 15 at the upper end of the vertical frame whose side members have been designated by reference numeral 11. From pulley 51, cable 49 extends downwardly and passes underneath pulley 52 that is carried by the transverse frame member 26 and from thence the cable passes forwardly and is connected with the outer end of lever 53 which is mounted for movement about pivot 54. A latching pawl 55 is pivoted at 56 and is provided with a notch 57 that receives the lower end of lever 53 when the parts are in the position shown in Figure 2. A spring 58 has one end connected with the latching pawl 55 and is tensioned to move the same towards the right when viewed as in Figure 2 to assure its engagement with the end of lever 53. A rope 59 is connected with the lower end of the pawl 55 and positioned so as to be readily accessible to the driver who, by means of this rope, can release lever 53 to permit the rake head to tilt from the full line to the dotted line position shown in Figure 3. A spring 60 is connected with lever 53 and has its lower end secured at 61 to a downwardly extending bracket 62 that is held against turning by means of braces 63. Spring 60 is of sufficient strength to return the rake head to the full line position shown in Figure 3 after the load has been deposited on the stack.

From Figures 2 and 3, it will be seen that frame 31, the vertical frame members 11, the lifting frame and cable 49 form a parallelogram that is deformable, the corners of which are pivots 22, 30, 50 and 51. As a result of this construction, frame 31 will remain practically parallel to the upright frame members 11 during the lifting and lowering of the lifting frame and this automatically keeps the rake teeth 29 at such an angle that the loading will not slide therefrom.

When the latch comprising pawl 55 is released or moved to the broken line position shown in Figure 3, lever 53 is free to rotate in response to the force exerted thereon by cable 49 and this permits the rake head to tilt sufficiently to let the hay slide onto the stack. After the load of hay has been thus released, spring 60 turns lever 53 in a clockwise direction until its lower end engages in the notch in the latching pawl, returning the rake head to the full line position shown in Figure 3. The lifting frame can now be rotated in a clockwise direction when viewed as in Figure 3, until it assumes the position shown in Figure 2, which is the position for gathering the hay, either from the swath left by the mower or from windrows.

Referring now more particularly to Figure 6, shaft 43 connects the two expanding brakes, one at each end of the axle housing 35 and the rotation of this shaft is controlled by means of a lever 64 that operates through a bell crank 65, a connecting rod 66 and a crank 67, for the purpose of turning shaft 43 to app'y and release the brake. The brake mechanism has not been shown in detail because it is merely an adaptation of the old and well known brake construction employed in the ordinary pleasure car. Although a specific arrangement of means for controlling the brake has been shown in Figure 6, it is to be understood that any other mechanical equivalent can be substituted. The mechanism shown and described is merely illustrative of means for contro'ling the brake.

Referring now again to Figure 4, it will be seen that cross braces 68 connect the rear tension members 20 so as to form a rigid rectangular assembly.

From the above description it will be seen that the mechanism is simple, that it can be constructed from standard structural steel and can be readily applied to any existing make of tractor. The fact that the device functions both as a rake and as a stacker, makes it possible to dispense with one of these implements as ordinarily used.

It is to be uderstood that instead of a rake head having teeth, any other lifting device can be substituted. For example, the teeth 29 can be replaced by steel fork tines and the machine used for loading manure or other material. It is also possible to employ a device of this kind for picking up and loading beets. It is, of course to be understood that applicant desires protection for any use to which this device can be put.

Although a specific construction of framework has been shown, it is to be understood that any changes within the scope of the claim can be made without departing from the invention.

In the actual construction, a limit stop is provided which stops the winch drums when the rear end of the lifting frame has reached a predetermined position in the lifting of the load, so as to prevent the development of breaking strains.

Having described the invention, what is claimed as new is:

A combined power hay rake and stacker comprising a vertical frame for rigid connection with a tractor, a shaft extending transversely of the frame at some distance below the top thereof, a lifting frame mounted for pivotation on the shaft, said frame comprising two substantially identical lifting arms, one on each side of the vertical frame, a rake head connected to the front ends of the lifting arms for pivotal movement about a horizontal axis connecting the arms, a winch connected with the rear end of the tractor, means for operating the winch by power from the tractor, the winch having two spaced drums, a cable connecting each drum with the rear end of a lifting arm, whereby when the cables are wound about the drums the front end of the lifting frame and the rake head will be raised, means comprising a brake mechanism for holding the winch in any desired position, means for automatically changing the angular relation between the rake head and the lifting frame when the latter is rocked about its pivot, said means comprising a frame extending upward'y from the rear of the rake head, a cable connected with the upper end of the rake head frame, a pulley connected with the upper end of the vertical frame at a distance above the shaft substantially equal to the distance from the rake head to the point where the cable is connected to the rake head frame, the cable passing about the pulley, whereby a distortable parallelogram is formed, means for anchoring the cable to the lifting frame comprising a readily releasable latch, and means comprising a spring for returning the parts to latched position.

LEONARD J. WASINGER.

REFERENCES CITED

The following references are of record in the file of this patent:

UNITED STATES PATENTS

| Number | Name | Date |
|---|---|---|
| 2,136,417 | Downey | Nov. 15, 1938 |
| 2,229,409 | Erickson | Jan. 21, 1941 |
| 2,242,511 | Cook | May 20, 1941 |
| 2,305,119 | Walker | Dec. 15, 1942 |